United States Patent
Miller et al.

(10) Patent No.: US 9,557,422 B1
(45) Date of Patent: Jan. 31, 2017

(54) SYSTEMS, METHODS, DEVICES AND SUBASSEMBLIES FOR CREATING AND DELIVERING A GNSS AUGMENTATION SERVICE

(71) Applicant: Apple Inc., Cupertino, CA (US)

(72) Inventors: Isaac T. Miller, San Mateo, CA (US); William J. Bencze, Half Moon Bay, CA (US); Robert Brumley, Philadelphia, PA (US); Brent M. Ledvina, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 633 days.

(21) Appl. No.: 14/103,752

(22) Filed: Dec. 11, 2013

Related U.S. Application Data

(60) Provisional application No. 61/735,798, filed on Dec. 11, 2012.

(51) Int. Cl.
| | | |
|---|---|---|
| *G01S 19/46* | (2010.01) | |
| *G01S 19/38* | (2010.01) | |
| *G01S 19/45* | (2010.01) | |
| *G01S 19/05* | (2010.01) | |
| *G01S 19/07* | (2010.01) | |

(52) U.S. Cl.
CPC ............. *G01S 19/46* (2013.01); *G01S 19/05* (2013.01); *G01S 19/07* (2013.01)

(58) Field of Classification Search
USPC ............ 342/357.21, 357.28, 357.29, 357.31; 701/468, 469
See application file for complete search history.

(56) References Cited

U.S. PATENT DOCUMENTS

| | | | | |
|---|---|---|---|---|
| 2008/0062039 A1* | 3/2008 | Cohen | ................. | G01S 19/05 342/357.29 |
| 2011/0238308 A1* | 9/2011 | Miller | ................. | G01C 21/28 701/472 |
| 2011/0312320 A1* | 12/2011 | Moeglein | ............ | G01S 19/252 455/426.1 |
| 2013/0203437 A1* | 8/2013 | Whelan | ................. | G01S 19/05 455/456.1 |

* cited by examiner

*Primary Examiner* — Dao Phan

(57) ABSTRACT

Systems, methods, devices and subassemblies for creating and delivering a GNSS augmentation service include one or more reference stations for receiving signals transmitted by navigation beacons and an augmentation server coupled to the reference stations. At least one of the reference stations is able to receive at least one of the signals from a low earth orbit satellite. Each of the reference stations determines first navigation observables based on the received signals and transmit information associated with the first navigation observables to the augmentation server. The augmentation server is configured to determine and distribute augmentation information to a receiver. The augmentation information is based on the received information associated with the first navigation observables, locations of the reference stations, and computational models. The distributed augmentation information is usable by the receiver to determine a high-precision position, velocity, and time solution for the receiver based on second navigation observables associated with the receiver.

12 Claims, 5 Drawing Sheets

| Perturbation | Model Input to Augmentation Server |
|---|---|
| Earth gravity | EGM-2008 Tide Free gravity model |
| Extra-planetary gravity | JPL DE-421 |
| Direct solar pressure | Montenbruck & Gill (Earth & lunar eclipses, umbra & penumbra), Iqbal model C solar irradiance model, Coarse assumptions about solar panels & antenna |
| Indirect solar pressure | Knocke Earth Radiation Pressure model, Iqbal model C solar irradiance model, Coarse assumptions about solar panels & antenna |
| Earth tides | IERS TN-36 |
| Atmospheric drag | NRL-MSISE00 density, NOAA solar / geomagnetic data |
| Relativistic effects | IERS TN-36 |
| Crustal & tectonic motion | DeMets et al. NUVEL-1A tectonic plate model |
| Ionosphere | IRI-2012, tomographic mapping |
| Troposphere | Saastamoinen dry & wet zenith delays, VMF-1 mapping function |

FIG. 2

SYSTEMS, METHODS, DEVICES AND SUBASSEMBLIES FOR CREATING AND DELIVERING A GNSS AUGMENTATION SERVICE

CROSS-REFERENCE TO RELATED APPLICATION(S)

The present application claims priority of U.S. provisional application 61/735,798, filed Dec. 11, 2012, entitled "Systems And Methods For GNSS Augmentation, Ionospheric Modeling And Observables, Communications And/Or Navigation Device Updates." The entirety of the foregoing application is incorporated by reference herein.

BACKGROUND

Field of the Invention

The present invention relates to the determination and generation of models and/or other augmentation information that may be used to support high-precision position, velocity, and/or timing (PVT) solutions based on signals received from overhead assets such as satellites and, in particular, to techniques suitable for providing rapid acquisition access to such PVT solutions without resort to a generally proximate, terrestrial ground station with a fixed and precisely known position.

Description of the Related Art

Radio signals have been used as an aid to navigation and to obtain position estimates for decades. In much the same way that sailors could navigate near land using two or more light houses, the earliest systems used a directional antenna that determined a bearing to two or more radio transmitters. As long as line of sight could be maintained between the receiver and the two or more radio transmitters, a location of the receiver could be determined by triangulating the known locations of the two or more radio transmitters and the bearings to each of those radio transmitters. And although this approach may generally provide just a horizontal location (latitude and longitude) of the receiver, this may be adequate for localized navigation, such as the landing of aircraft or the navigation of ships around nearby navigational hazards.

Limiting radio navigation systems to local two-dimensional positioning, however, does not address many interesting positioning problems. For example, surveyors often desire to know the height/altitude of a location as well as its latitude and longitude, and pilots of aircraft often desire to know their altitude. To address these desires, more complex and longer distance radio navigation systems are typically utilized. Many of these radio navigation systems rely on the basic principle that radio waves generally propagate through the air at a known speed. By measuring the length of time it takes for a radio wave to propagate between a transmitter and a receiver, a distance between the transmitter and the receiver may be determined. By using the distance between the receiver and several transmitters with known locations, it is possible to determine the position of the transmitter by trilateration. For example, by using three transmitters, it is possible to determine the latitude, longitude, and altitude of the receiver. As additional transmitters are used and detected by the receiver, additional variables may be removed from the solution. For example, by adding time information to the radio signals, a fourth transmitter may be used to solve for the current time at the receiver.

Global Positioning Satellite (GPS) navigation, and more broadly Global Navigation Satellite System (GNSS) navigation, has become the standard for most military and civilian radio navigation applications. There exist in both military and civil sectors hundreds of millions of GPS or GNSS receivers that are used daily to provide real-time positioning and navigation. The GPS system is based on a constellation of approximately 24 to 32 middle-earth orbit (MEO) satellites that broadcast continuous carrier wave signals. A GPS receiver typically relies on the ability to receive signals from four or more satellites allowing the receiver to determine latitude, longitude, altitude, and time error at the receiver. For a typical GPS receiver, accuracy in location to within about 10 meters may be rapidly obtained.

To obtain higher precision PVT solutions for a GNSS receiver typically requires an augmentation to the general GNSS infrastructure. Traditional augmentation approaches for satellite navigation techniques include real time kinematic (RTK) and differential GPS (DGPS) precise point positioning (PPP) techniques that are commonly used in surveying and high accuracy timing applications. In a typical RTK system, a base station is installed in a fixed and known location. Once the base station is able to obtain a PVT solution from the satellite transmissions, it is able to transmit any differences between its known location and the PVT solution as a correction signal to a nearby mobile or roving unit. RTK systems are typically fairly expensive, require time to set-up the base station, and the base station and mobile unit need to stay within a close proximity to each other. In a typical PPP system, a network of fixed reference stations receive the satellite signals and generate correction information that is distributed to the GNSS receiver using satellites or other terrestrial-based wireless technology, such as a cellular network. While less expensive than RTK systems, a GNSS receiver in a PPP system generally takes up to 30 minutes to converge on a high precision PVT solution and provides poor coverage at high latitudes or in challenging environments such as cities, steep terrain, and heavily wooded areas.

Improved techniques are desired.

SUMMARY

It has been discovered that position, velocity, and/or timing (PVT) solutions may be provided with levels of precision that have previously and conventionally been associated with RTK and PPP systems without many of the drawbacks. Using the augmentation techniques described herein, high-precision PVT solutions may be provided without resort to a generally proximate, terrestrial ground station having a fixed and precisely known position. Instead, techniques described herein utilize a series of reference stations that track one or more combinations of traditional GNSS satellites that are in MEO, geostationary satellites, geosynchronous satellites, terrestrial beacons, low earth orbiting (LEO) satellites, and/or the like. The LEO satellites may include one or more satellites in the Iridium constellation. The use of the shorter orbital period LEO satellites significantly improves the time to achieve geometric diversity, reducing convergence time from 30 minutes down to as little as 1 or 2. In addition, the use of the orbital diversity of some LEO satellites also provides better high-precision PVT coverage at high latitudes and in challenging environments, thus providing higher deployment flexibility.

Using the developed techniques, a GNSS augmentation service uses a series of terrestrially-based reference stations to track one or more combinations of MEO satellites, geostationary satellites, geosynchronous satellites, terrestrial beacons, LEO satellites, and/or the like, such as combinations of the GPS satellites, and LEO satellites, such as the Iridium satellites. Using the tracking information from both the navigation beacons and/or LEO satellites, the augmentation service generates modeling and other correction (augmentation) information that is then distributed to GNSS receivers using satellite, cellular, wireless, and/or wired techniques. The GNSS receivers use the augmentation information to correct their own observation of the navigation beacon and/or LEO signals to arrive at a high-precision PVT solution with initial convergence times of as little as one to two minutes or less.

In some embodiments, a method of augmented GNSS positioning includes receiving at one or more reference stations first signals transmitted by one or more navigation beacons, determining by the reference stations first navigation observables based on the received first signals, receiving at an augmentation server information associated with the first navigation observables, determining by the augmentation server augmentation information, transmitting the augmentation information to a receiver using a distribution network, receiving by the receiver the augmentation information, receiving by the receiver second signals transmitted by the one or more navigation beacons, determining by the receiver second navigation observables based on the received second signals, and determining by the receiver a high-precision position, velocity, and time (PVT) solution for the receiver based on the received augmentation information and the second navigation observables. At least one of the reference stations receives at least one of the first signals from a low earth orbit (LEO) satellite. The augmentation information is based on at least the received information associated with the first navigation observables, known or computed locations of the reference stations, and computational models.

In some embodiments, a GNSS augmentation system includes one or more reference stations configured to receive first signals transmitted by one or more navigation beacons and an augmentation server coupled to the reference stations. At least one of the reference stations receiving at least one of the first signals from a low earth orbit (LEO) satellite. Each of the reference stations is configured to determine first navigation observables based on the received signals and transmit information associated with the first navigation observables to the augmentation server. The augmentation server is configured to determine augmentation information and distribute the augmentation information to a receiver using a distribution network. The augmentation information is based on at least the received information associated with the first navigation observables, known or computed locations of the reference stations, and computational models. The distributed augmentation information is usable by the receiver to determine a high-precision position, velocity, and time (PVT) solution for the receiver based on second navigation observables associated with the receiver.

DESCRIPTION OF THE DRAWINGS

FIG. 2 is a simplified diagram of perturbation effects and corresponding models that may be used by the augmentation server of FIG. 1 according to some embodiments.

The present invention may be better understood, and its numerous objects, features, and advantages made apparent to those skilled in the art by referencing the accompanying drawings. Further details are provided in Appendix A, which forms an integral portion of the present disclosure.

DETAILED DESCRIPTION

Figure 1:
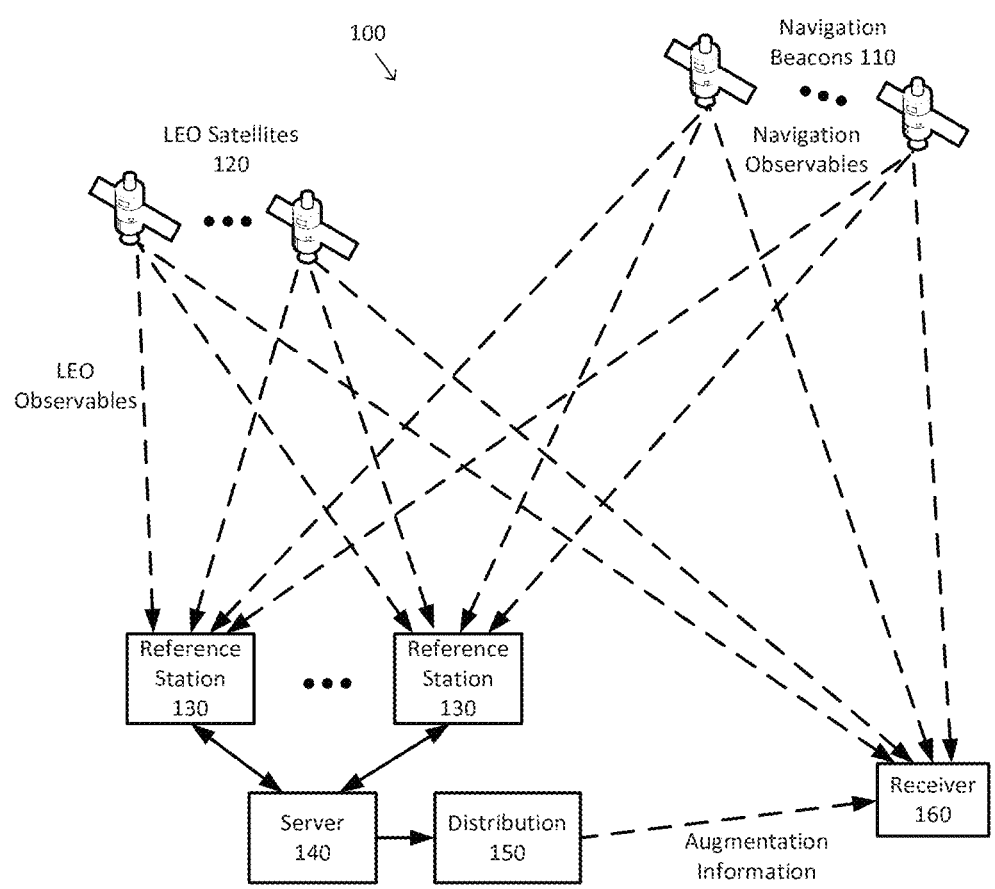
FIG. 1 is a simplified diagram of an augmented radio navigation system according to some embodiments.

FIG. 1 is a simplified diagram of an augmented radio navigation system 100 according to some embodiments. As shown in FIG. 1, augmented radio navigation system 100 includes one or more navigation beacons 110 and one or more LEO satellites 120. In some embodiments, the navigation beacons 110 may include MEO satellites, geostationary satellites, geosynchronous satellites, terrestrial beacons, and/or the like. In some examples, the LEO satellites 120 may also be referred to as navigation beacons. In some examples, the MEO satellites may be GPS satellites and/or the LEO satellites 120 may be Iridium satellites. Each of the navigation beacons 110 and the LEO satellites 120 transmit one or more signals that may become navigation and LEO observables, respectively, when they are received by one or more reference stations 130. Depending upon the locations of the navigation beacons 110, the LEO satellites 120, and the reference stations 130, each of the reference stations 130 may observe navigation and/or LEO observables from different combinations of the navigation beacons 110 and/or the LEO satellites 120. In some examples, some of the reference stations 130 may not receive any LEO observables. In some examples, some of the reference stations 130 may not receive any navigation observables. Reference stations 130 are typically terrestrially-based and have a known or computed location. In some embodiments, the reference stations 130 may be distributed throughout an area for which augmentation services are desired. In some examples, the number of references stations 130 that are used to receive LEO observables is typically quite small, with approximately 15 reference stations 130 with this capability being capable of supporting a worldwide augmented radio navigation system with an accuracy of at least ten centimeters, 95% of the time. In some examples, the accuracy may be as precise as two or three centimeters or less. Each of the references stations 130 shares information about the received navigation and LEO observables with an augmentation server 140 using a network or other communication system. In some embodiments, the references stations 130 may also provide additional information to the augmentation server, including such information as local weather conditions.

In some embodiments, the augmentation server 140 may be a standalone workstation, a cluster, a production server, within a virtual machine, a plurality of computer servers using distributed processing, and/or the like. In some examples, augmentation server 140 may be implemented using a cloud-based computing infrastructure. In some examples, augmentation server 140 may include one or more processors coupled to memory. In some examples, the one or more processors may control operation and/or execution of hardware and/or software on augmentation server 140. In some examples, each of the one or more processors may be a CPU, a multi-core processor, a field programmable gate array (FPGA), an application specific integrated circuit (ASIC), a virtual processor, and/or the like. The memory may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Using the information about the navigation and/or LEO observables and the locations of the reference stations 130, the augmentation server 140 uses one or more models to develop augmentation information that may be used to account for various perturbations in the navigation and/or LEO observables that commonly affect radio signals transmitted over long distances through the atmosphere. In some examples, the augmentation server 140 may also compute the locations of the reference stations 130 based on the navigation and/or LEO observables.

FIG. 2 is a simplified diagram of perturbation effects and corresponding models that may be used by augmentation server 140 according to some embodiments. As shown in FIG. 2, the perturbations may include effects due to gravitation, solar activity, tides, relativity, tectonic motion, the ionosphere, and/or the troposphere. Each of these perturbations may be addressed using one or more known and/or improved models as noted in FIG. 2. Some embodiments may also include other sources of perturbations such as space vehicle thrust maneuvers, exogenous perturbing forces, ocean and atmospheric tides, tidal loading effects, multipath and/or signal reflection models, reference station and/or receiver antenna models, and/or the like. These, and the perturbations noted in FIG. 2, may be modeled, for example, via coefficients and/or known information, and/or may be estimated as part of the augmentation and/or correction information. In some embodiments, one or more perturbations may be ignored.

Referring back to FIG. 1, based on the modeling of the navigation and/or LEO observables as affected by the various perturbations of FIG. 2, the augmentation server 140 determines augmentation and/or correction information to account for errors in positions and/or clocks of the navigation beacons 110 and/or the LEO satellites 120 as well as other atmospheric effects due to the troposphere and the ionosphere. The determined augmentation information is sufficiently broad in geographic and/or temporal scope that it may account not only for the errors and/or perturbations in the navigation and/or LEO observables received at the reference stations 130, but also account for expected errors and/or perturbations that are anticipated at radio navigation receivers, such as receiver 160, that may be located at significant distances from any of the reference stations 130. More specifically, computational techniques that are described in greater detail in an Algorithm Description included with Appendix A, may be used by augmentation server 140 to model and/or determine the augmentation information.

The augmentation information is made available to receiver 160 using one or more distribution systems 150. In some embodiments, distribution system 150 may include one or more networks including local area networks (LANs), such as Ethernets, and/or wide area networks (WANs), such as the internet. In some examples, one or more of the networks may be proprietary to prevent sharing of the augmentation information with recipients other than authorized users. In some examples, at least the last segment of the one or more networks in distribution system 150 is wireless in nature so that receiver 160 is not tethered via a cable to distribution system 150. In some examples, the last segment may be implemented using any wireless technology including wireless hot spots, cellular networks, satellite transmissions, and/or the like. In some examples, distribution system 150 may forward the augmentation information to an uplink station for the navigation beacons 110 and/or the LEO satellites 120 so that the augmentation information may be distributed by the navigation beacons 110 and/or the LEO satellites 120. In some examples, the augmentation information may be transmitted as data embedded in the signals transmitted by the navigation beacons and/or the LEO satellites.

In some embodiments, the augmentation information distributed by augmentation server 140 to receiver 160 may be less than all of the augmentation information available to augmentation server 140. Full worldwide augmentation information may be several megabytes or larger in size and may be sufficiently dynamic to require regular updates. Thus, it may not be practical and/or possible to distribute this much augmentation information throughout the augmented radio navigation system 100.

In some embodiments, the augmentation server 140 may reduce the amount of augmentation information distributed to receiver 160 based on geographic information associated with receiver 160 and/or the last segment in distribution system 150 to receiver 160. In some examples, when the last segment in distribution system 150 is only capable of reaching receivers 160 in a limited geographic area, the augmentation information may be limited to the augmentation information associated with that limited geographic area. For example, the limited geographic area may be defined by a transmission range for a wireless hot spot/network, a cellular tower/network, a satellite spot beam, and/or the like. In some examples, this may include distributing satellite clock and/or orbit correction information associated with only the satellites from which observables may be received at the respective receiver 160. For example, a receiver 160 located in North America does not generally have to receive augmentation information associated with a satellite currently over Australia. In some examples, this may include distributing ionospheric, tropospheric, and/or multipath correction information associated with the limited geographic area. For example, a receiver 160 located in North America does not generally have to receive augmentation information associated with the ionosphere, atmosphere, and/or multipath environment in Australia.

In some embodiments, the augmentation server 140 may reduce the amount of augmentation information distributed to receiver 160 based on temporal information associated with receiver 160 and/or the last segment in distribution system 150. In some examples, one or more users of receiver 160 may desire to limit reception of the augmentation information only during periods when receiver 160 is active, during periods of subscription, and/or the like. In some examples, when no receivers 160 within a limited geographic area associated with a last segment in distribution system 150, it may be possible to temporarily suspend distribution of the augmentation information in that limited geographic area.

In some embodiments, the augmentation server 140 may also distribute augmentation information that varies in geometric scope, temporal scope, resolution, and/or the like from already modeled augmentation information. In some examples, the augmentation server 140 may use one or more numerical interpolation and/or extrapolation methods to generate the augmentation information for distribution.

In some embodiments, the augmented information may include modeling information that receiver 160 may use to determine a high-precision PVT solution for receiver 160. In some examples, the modeling information may include modeling data for ionospheric effects, tropospheric effects, corrected ephemerides for the navigation beacons 110 and/or LEO 120 satellites, clock drift and/or frequency errors in the navigation beacons 110 and/or LEO 120 satellites, modeling data for multipath effects and/or signal reflections, modeling data for specific receiver antenna types, and/or the like.

In some embodiments, receiver 160 may be an augmented and/or enhanced version of a conventional GNSS or GPS receiver. In some examples, receiver 160 may be enhanced to receive not only the navigation observables from the navigation beacons 110, but also the LEO observables from the LEO satellites 120. In some examples, receiver 160 may be further enhanced to receive the augmentation information from augmentation server 140 and use the augmentation information to correct the navigation and/or LEO observables to obtain a high-precision PVT solution for receiver 160. In some examples, the use of the LEO observables in determining the augmentation information and reception of the LEO observables by receiver 160 may allow receiver 160 to converge on the high-precision PVT solution in ten minutes or less. In some examples, the convergence may occur in two minutes or less.

In some embodiments, receiver 160 may be associated with a mobile phone or other portable device. A custom application may be made available to the portable device that may be used to receive the augmentation information from augmentation server 140 and to use the received augmentation information to improve the accuracy and/or precision of the PVT solutions computed for the mobile device.

Figure 3:
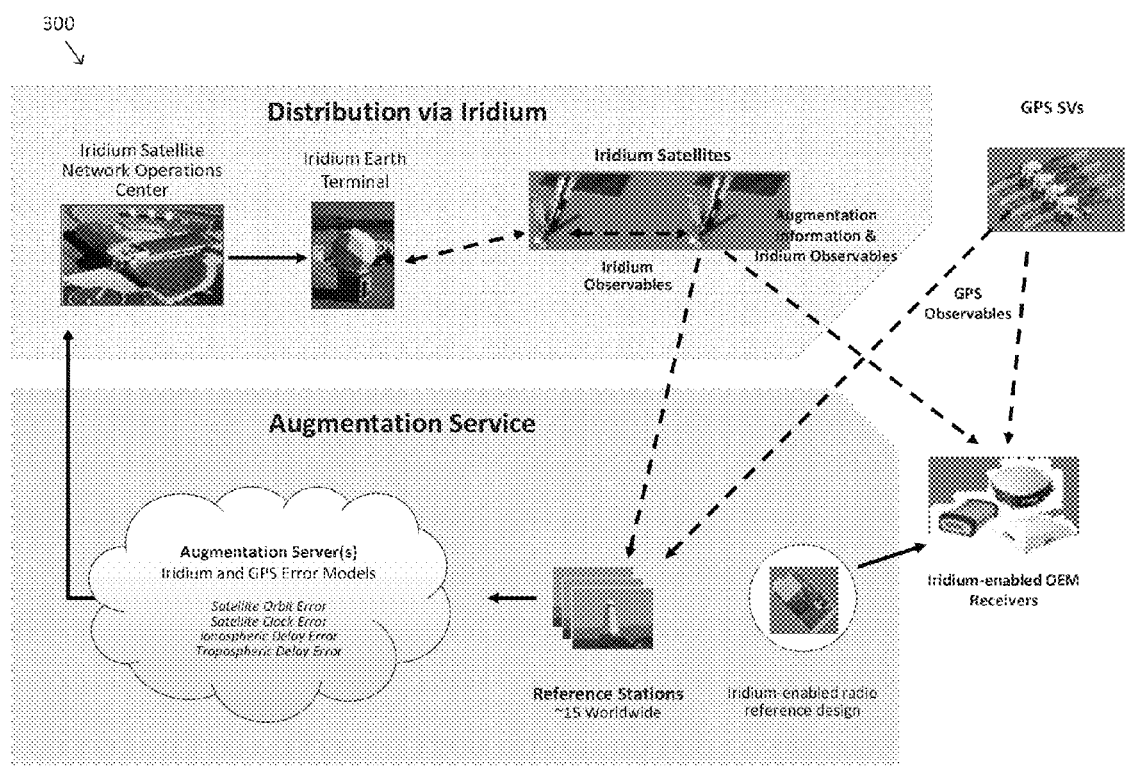
FIG. 3 is a simplified diagram of an augmented radio navigation system according to some embodiments.

FIG. 3 is a simplified diagram of an augmented radio navigation system 300 according to some embodiments. As shown in FIG. 3, the augmented radio navigation system 300 is one possible implementation of the augmented radio navigation system 100 using GPS satellites as the navigation beacons 110 and the Iridium satellites as the LEO satellites 120. The augmented radio navigation system 300 further uses the Iridium communication system for at least a portion of the distribution system 150 including the last segment to the receiver.

Figure 4:
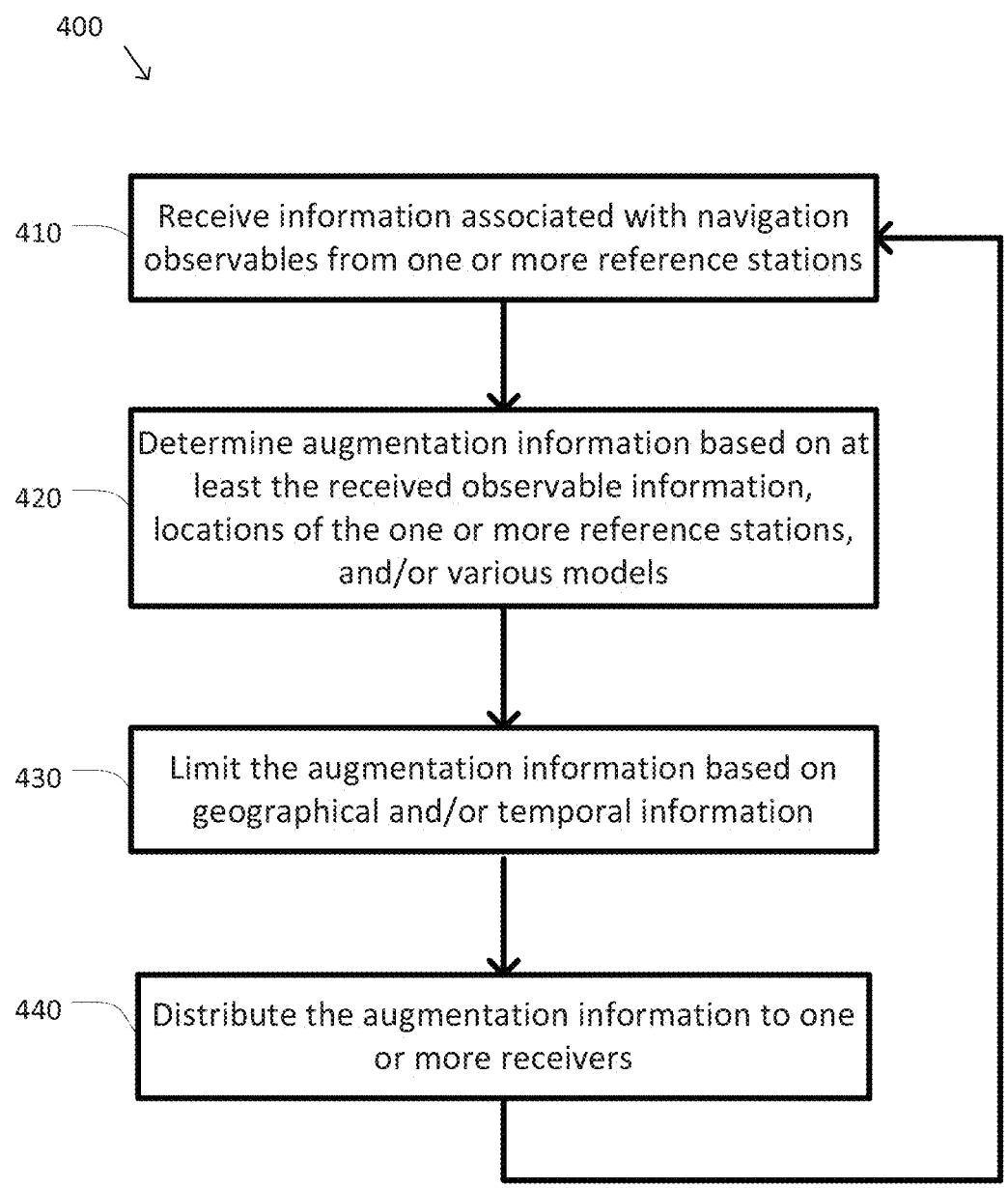
FIG. 4 is a simplified diagram of a method of providing GNSS augmentation information according to some embodiments.

FIG. 4 is a simplified diagram of a method 400 of providing GNSS augmentation information according to some embodiments. In some embodiments, one or more of the processes 410-440 of method 400 may be implemented, at least in part, in the form of executable code stored on non-transient, tangible, machine readable media that when run by one or more processors (e.g., the one or more processors associated with augmentation server 140) may cause the one or more processors to perform one or more of the processes 410-440.

At a process 410, information associated with navigation observables is received from one or more reference stations. One or more references stations in an augmented radio navigation system receive signals transmitted by one or more navigation beacons and generate observables associated with the received signals. In some embodiments, the reference stations may be the reference stations 130 and/or the reference stations of FIG. 3. In some embodiments, the augmented radio navigation system may be the augmented radio navigation system 100 and/or 300. In some embodiments, the navigation beacons may be the navigation beacons 110, the LEO satellites 120, the GPS satellites in FIG. 3, and/or the Iridium satellites in FIG. 3. In some embodiments, the navigation observables are associated with one or more MEO satellites and one or more LEO satellites. In some embodiments, the information associated with the navigation observables may include errors between the known or computed locations of the reference stations and the observed location of the reference stations. In some embodiments, additional information may be received from the reference stations, such as local weather information.

At a process 420, augmentation information is determined based on at least the received observable information, locations of the one or more reference stations, and/or various models. In some examples, the locations of the reference stations may be known or computed based on the received observable information. In some examples, the various models may include one or more of the models in FIG. 2 to account for various perturbations that may affect the observables received by the reference stations. Some embodiments may also include other sources of perturbations, such as space vehicle thrust maneuvers, exogenous perturbing forces, ocean and/or atmospheric tides, tidal loading effects, multipath and/or signal reflection models, reference station and/or receiver antenna models, and/or the like. These, and the perturbations noted in FIG. 2, may be modeled, for example, via coefficients and/or known information, and/or may be estimated as part of the augmentation and/or correction information. In some embodiments, one or more perturbations may be ignored. In some embodiments, the augmented information may include modeling information that a receiver, such as receiver 160, may use to determine a high-precision PVT solution for the receiver. In some examples, the modeling information may include modeling data for ionospheric effects, tropospheric effects, corrected ephemerides for the satellites associated with the satellite observables, clock drift and/or frequency errors in the satellites, modeling data for multipath effects and/or signal reflections, modeling data for specific receiver antenna types, and/or the like. In some embodiments, depending on the desired scope and/or resolution of the augmentation information, determination of the augmentation information may include using one or more numerical methods for interpolation and/or extrapolation.

At an optional process 430, the augmentation information may be limited based on geographic and/or temporal information. To limit the amount of augmentation information that may be distributed to receivers, the augmentation information may be limited in scope based on geographic and/or temporal information associated with the receivers.

In some embodiments, the amount of augmentation information distributed to the receivers may be limited based on geographic information associated with the respective receivers and/or the last segment in a distribution system used to provide the augmentation information to the receivers. In some examples, when the last segment in the distribution system is only capable of reaching receivers in a limited geographic area, the augmentation information may be limited to the augmentation information associated with that limited geographic area. For example, the limited geographic area may be defined by a transmission range for a wireless hot spot/network, a cellular tower/network, a satellite spot beam, and/or the like. In some examples, this may include distributing navigation beacon clock and/or orbit correction information associated with only the navigation beacons from which observables may be received at receivers in the limited geographic area. In some examples, this may include distributing ionospheric, tropospheric, and/or multipath correction information associated with the limited geographic area.

In some embodiments, the amount of augmentation information distributed to the receivers may be limited based on temporal information associated with receivers and/or the last segment in the distribution system. In some examples, one or more users of the respective receivers may desire to limit reception of the augmentation information only during periods when the respective receivers are active, during periods of subscription, and/or the like. In some examples, when there are no receivers within a limited geographic area associated with a last segment in the distribution system, it may be possible to temporarily suspend distribution of the augmentation information in that limited geographic area.

At a process 440, the augmentation information may be distributed to one or more receivers. The augmentation information determined during process 420 and/or optionally limited during process 430 is distributed to one or more receivers so that the receivers may use the augmentation information to develop a high-precision PVT solution based on the navigation observables detected by the respective receivers. In some embodiments, the augmentation information may be distributed using a distribution system similar to distribution system 150. In some examples, the distribution system may include one or more networks including local area networks (LANs), such as Ethernets, and/or wide area networks (WANs), such as the internet. In some examples, one or more of the networks may be proprietary to prevent sharing of the augmentation information with recipients other than authorized users. In some examples, at least the last segment of the one or more networks in the distribution system is wireless in nature so that the receivers are not tethered via a cable to the distribution system. In some examples, the last segment may be implemented using any wireless technology including wireless hot spots, cellular networks, satellite transmissions, and/or the like. In some examples, the distribution system may forward the augmentation information to an uplink station associated with one or more satellites so that the augmentation information may be distributed by the satellites. In some examples, the augmentation information may be transmitted as data embedded in the signals that form the navigation observables received by the reference stations and/or the receivers.

Figure 5:
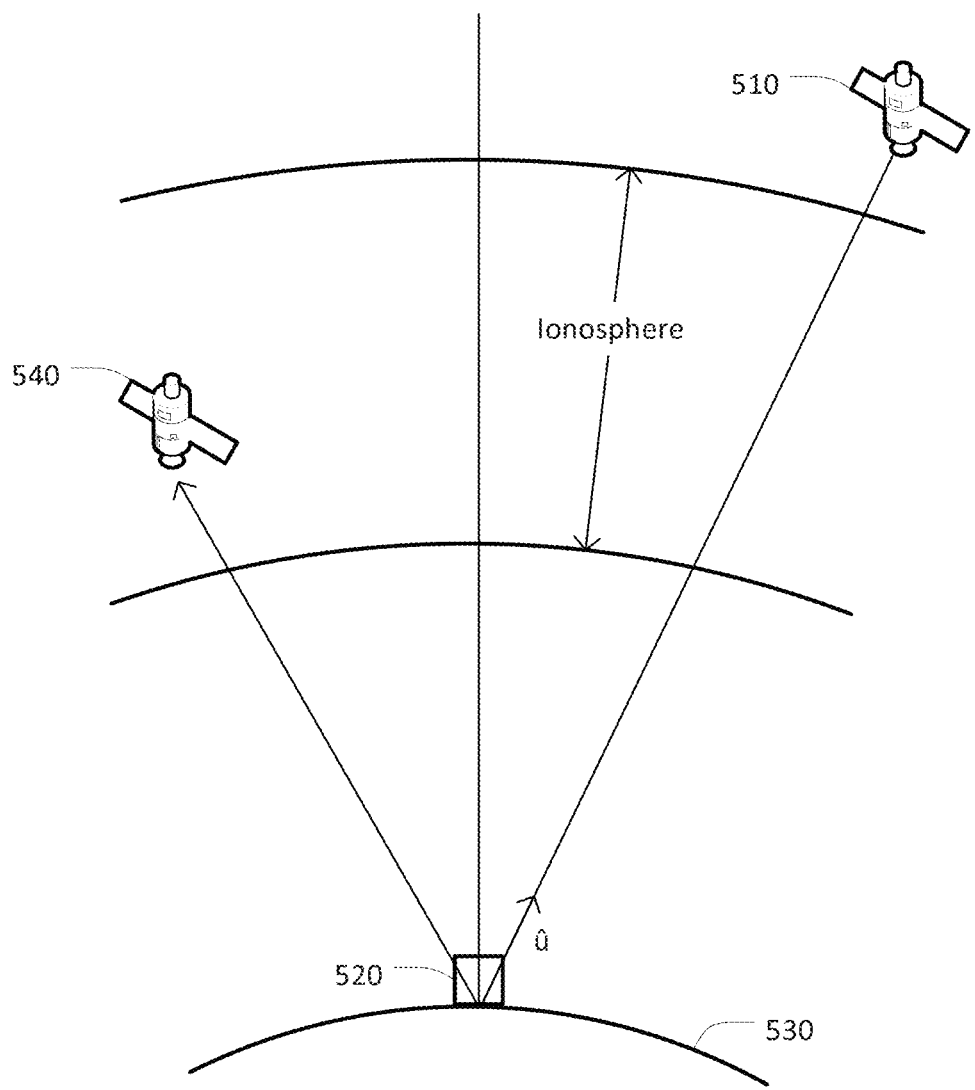
FIG. 5 is a simplified diagram of tropospheric modeling according to some embodiments.

FIG. 5 is a simplified diagram of tropospheric modeling according to some embodiments. As shown in FIG. 5, the effect that the ionosphere has on navigation observables depends on where the satellite is located relative to the ionosphere. The ionosphere extends from about 90 km to 1600 km above the surface of the earth and is composed of plasma containing free electrons and ions. This plasma affects electromagnetic waves in very predictable ways that should be accounted for in augmented radio navigation systems 100 and/or 300. The speed of propagation of radio signals through the ionosphere depends on the number of free electrons in the path of the radio signal. During night time hours the number of free electrons in the ionosphere maintains a relatively low and stable value, but during the day solar radiation and/or solar flares significantly increase the level of free electrons in the ionosphere and thus the impact the ionosphere may have on the navigation observables.

Many models exist for determining the impact of the ionosphere on the navigation observables for satellites located above the ionosphere, such as a MEO satellite 510 as shown in FIG. 5. Some models are empirical in nature and others are based on first principles, such as those based on measurements made at two different nominal carrier frequencies broadcast from the same transmitter. In some systems, the effect of the ionosphere may be modeled using the Klobuchar Model. The Klobuchar Model is based on a four-parameter zenith model of the effect the ionosphere has on a radio signal traveling vertically between a transmitter and receiver that are respectively above and below the ionosphere. The Klobuchar Model is shown in Equation 1.

$$\tilde{I} = \begin{cases} c\left[A_1 + A_2\cos\left(\frac{2\pi(t--A_3)}{A_4}\right)\right], & |t-A_3| < \frac{A_4}{4} \\ cA_1 & \text{otherwise} \end{cases} \quad (1)$$

The four parameters, $A_1$-$A_4$, which vary by the frequency of the signal being transmitted by satellite 510, may be provided to the receivers, such as receiver 520 located on the surface of the earth 530, as part of the augmentation information distributed by an augmentation server. In some embodiments, the effect of the ionosphere from Equation 1 may also be adjusted to account for the increased distance the received signal travels through the ionosphere when, for example, the transmitter is not located directly above the receiver 520 as is the case for satellite 510. This adjustment may be determined by knowing the line of sight unit vector û, determined using the positions of satellite 510 and receiver 520. In some examples, the position of satellite 510 may be included in or may derivable from the augmentation information and the position of receiver 520 may be estimated from a recent PVT solution for receiver 520. In some embodiments, $\tilde{I}$ may be multiplied by the obliquity factor OF of Equation 2 to make this adjustment, where ζ is the angle of the satellite from the zenith and is derivable from the line of sight unit vector û, $R_E$ is the average radius of the earth, and $h_I$ is the mean ionospheric height, which typically ranges from 300 to 400 km.

$$OF = \sqrt{1 - \left(\frac{R_E \sin\zeta}{R_E + h_I}\right)^2} \quad (2)$$

The Klobuchar Model of Equation 1, even when adjusted by the obliquity factor of Equation 2, does not provide a very complete model of the effects of the ionosphere on the satellite observables when, as in the case of a LEO satellite 540, the LEO satellite 540 is located within the ionosphere. The Klobuchar Model of Equation 1 and other ionosphere models, typically model the total electron count (TEC) and/or a similar quantity for the entire ionosphere as if the ionosphere were a thin shell between the satellite, such as satellite 510, and the receiver 520. As the location of the LEO satellite 540 demonstrates, the ionosphere is not a thin shell and a more complex ionospheric model, such as a tomographic model should be used that accounts for the location of satellite 540 within the ionosphere. In some examples, this tomographic model uses a non-uniform model of the ionosphere to account for free electron densities that vary depending on the location and altitude within the ionosphere. Distribution of the tomographic model of the ionosphere with the augmentation information would permit receiver 520 to remove the effects due to the portion of the ionosphere located above satellite 540 when processing and analyzing observables from satellite 540. In some examples, this would improve the accuracy and precision of the PVT solution determined for receiver 540.

Some embodiments of the augmentation server 140 may include non-transient, tangible, machine readable media that include executable code that when run by one or more processors may cause the one or more processors to perform the processes of method 400 as described above. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

APPENDIX A

Idea 1: Geographically-Relevant GNSS Augmentation Service Data

- Observation: GNSS corrections service data delivered to user will likely consist of (for example) precise satellite orbit and clock data and potentially also ionospheric and tropospheric corrections
- Observation: not all of this information is relevant to every user
  - Example: user does not need orbit and clock data for satellites that he can't see
- Observation: user won't be able to receive full worldwide ionosphere or troposphere model because they may be too detailed, big, or change too fast for the user to download in a timely manner
  - Example: a full spherical harmonics model of the Earth's ionosphere may consist of many megabytes of coefficients that change rapidly; this is too much to download and use in a timely manner
- Observation: if GNSS corrections service can determine location of a specific user or group of users in a geographical area, then the service provider can tailor the corrections information to that user
  - Benefit: reduces overall data required to get user up and running
  - Benefit: improved "accuracy per bit" of GNSS corrections service data by reducing "bit waste"

© 2012 Coherent Navigation, Inc. All rights reserved. COHERENT NAVIGATION PROPRIETARY

Idea 1: Geographically-Relevant GNSS Augmentation Service Data

- Title: method and system for distributing geographically-relevant GNSS augmentation data to users
- Embodiments may include:
  o A service provider with GNSS augmentation data applicable to a wide geographic region
  o A means to deliver said data in said wide geographic region
  o The same service provider also having GNSS augmentation data applicable to a limited geographic region that is different from (but may be derived from or related to) the total data applicable to the wide geographic region
  o A means to deliver said data applicable to said limited geographic region © 2012 Coherent Navigation, Inc. All rights reserved. COHERENT NAVIGATION PROPRIETARY

Idea 1: Geographically-Relevant GNSS Augmentation Service Data

- Dependent claim: determine limited geographic region via satellite spot beam
- Dependent claim: determine limited geographic region via Iridium spot beam
- Dependent claim: determine limited geographic region via IP addresses in that region
- Dependent claim: determine limited geographic region via connection to / visibility of a particular cell tower
- Dependent claim: determine limited geographic region by the location of one or more service consumers (users) desiring to receive data in a limited geographic region
- Dependent claim: determine limited geographic region by one or more users actively telling service provider his location via communication
  - Example: uplink transfer via Iridium satellite
  - Example: ethernet style packet transfer via 3G data connection © 2012 Coherent Navigation, Inc. All rights reserved. COHERENT NAVIGATION PROPRIETARY

Idea 1: Geographically-Relevant GNSS Augmentation Service Data

- Example reduction to practice:
  - Service provider builds global models of GNSS satellite orbits, clocks, Earth ionosphere, and Earth troposphere
  - Service provider chooses one Iridium satellite spot beam as the "limited geographic region" in which he is broadcasting
  - Service provider determines which Iridium (and other GNSS) satellites should be visible to a user in the selected Iridium spot beam
  - Service provider broadcasts orbit and clock data only for satellites expected to be visible in the selected Iridium spot beam © 2012 Coherent Navigation, Inc. All rights reserved. COHERENT NAVIGATION PROPRIETARY

Idea 2: Temporally-Relevant GNSS Augmentation Service Data

- Observation: GNSS augmentation service data delivered to user will likely consist of (for example) precise satellite orbit and clock data and potentially also ionospheric and tropospheric corrections
- Observation: this information is only relevant to the user when he is operating his equipment and desiring to receive the corrections
  - Example: user does not need any of the data when his equipment is not operating
- Observation: if GNSS augmentation service can determine when a specific user or group of users wants augmentation data, then the service provider need only make the data available when the user wants it
  - Benefit: reduced service operating costs by only broadcasting service in areas and at times of day where users desire it © 2012 Coherent Navigation, Inc. All rights reserved. COHERENT NAVIGATION PROPRIETARY

Idea 2: Temporally-Relevant GNSS Augmentation Service Data

- Title: method and system for distributing temporally-relevant GNSS augmentation data to users
- Embodiments may include:
  - A service provider with GNSS augmentation data applicable to a geographic region
  - The same service provider also having GNSS augmentation data applicable to a specific time window, where said data is different from (but may be derived from or related to) the total data applicable to the geographic region
  - A means to deliver said data in said geographic region © 2012 Coherent Navigation, Inc. All rights reserved. COHERENT NAVIGATION PROPRIETARY

Idea 2: Temporally-Relevant GNSS Augmentation Service Data

- Dependent claim: the said specific time window is determined by one or more service consumers (users) desiring to receive data at a particular time
- Dependent claim: the said specific time window is determined by one or more service consumers (users) actively requesting service data at a particular time
  - Example: uplink transfer via Iridium satellite
  - Example: ethernet style packet transfer via 3G data connection
- Dependent claim: the said specific GNSS augmentation data applicable to the specific time window is Iridium satellite data (applicable for short time windows) and GPS satellite data (applicable for longer time windows)

© 2012 Coherent Navigation, Inc. All rights reserved. COHERENT NAVIGATION PROPRIETARY

Idea 2: Temporally-Relevant GNSS Augmentation Service Data

- Example reduction to practice:
  - Service provider builds global models of GNSS satellite orbits, clocks, Earth ionosphere, and Earth troposphere
  - A user desires to receive GNSS augmentation information from the service provider, and so turns on his receiver
  - The user's receiver communicates the user's desire to receive data from the service provider via Iridium uplink
  - The service provider initiates a broadcast at the user's receiver's request, supplying the user with model data valid at the current time © 2012 Coherent Navigation, Inc. All rights reserved. COHERENT NAVIGATION PROPRIETARY

Idea 3: Ionospheric Data from Iridium Burst Frequency Separation

- Observation: Earth's Ionosphere induces delays in GNSS satellite signals operating in the L-band
  - Delay typically results in about 5m added ranging error
- Observation: precise absolute range measurements from GNSS satellites must compensate for these delays to be useful, either by measuring the delays directly or compensating for them via model
  - Direct measure of ionospheric delay $\Delta t$ at frequency $f_1$ can be made by measuring differential time delay $\delta t$ between two simultaneous signals transmitted at different frequencies $f_1$ and $f_2$:

$$\Delta t = \left(\frac{f_2^2}{f_1^2 - f_2^2}\right)\delta t$$

- Observation: Iridium broadcasts in multiple frequency slots, but currently only one at a time per user

Idea 3: Ionospheric Data from Iridium Burst Frequency Separation

- Title: method and system for determining radio signal delay due to ionosphere via near-simultaneous Iridium satellite broadcasts
- Embodiments may include:
  - An Iridium satellite transmitting two signals at two different frequencies at approximately the same time such that the signal path from the two signals to the point of reception is substantially the same
  - An Iridium radio capable of receiving at least two Iridium signals on at least two different known frequencies at approximately the same time
  - A means for the radio to determine the differential time delay between the two signals © 2012 Coherent Navigation, Inc. All rights reserved. COHERENT NAVIGATION PROPRIETARY

Idea 3: Ionospheric Data from Iridium Burst Frequency Separation

- Example reduction to practice:
  - An Iridium radio with at least two channels capable of simultaneous tracking
  - Make two simultaneous Iridium calls to the radio on different frequencies
  - The radio measures the differential time delay between the two calls in a single transmission burst, and uses the time delay to calculate an ionospheric delay for one of the phone calls

Idea 4: Tomographic Model for LEO Satellite Ionosphere Delay

- Observation: Earth's Ionosphere induces delays in GNSS satellite signals operating in the L-band
  ○ Delay typically results in about 5m added ranging error
- Observation: existing GNSS satellite ionosphere models seek only to calculate the total electron content (TEC) or a similar quantity for the entire ionosphere, effectively modeling the ionosphere as a thin shell in between the satellite and the Earth
- Observation: a non-negligible portion of the ionosphere lies above Low-Earth orbit satellites, including Iridium
- Observation: a tomographic map of the ionosphere, which models electron content as a function of position, would allow a navigation user of LEO satellites to discount the (irrelevant) portion of the ionosphere above the LEO satellite for the purposes of navigation
  ○ Benefit: improved navigation ranging accuracy © 2012 Coherent Navigation, Inc. All rights reserved. COHERENT NAVIGATION PROPRIETARY

Idea 4: Tomographic Model for LEO Satellite Ionosphere Delay

- Title: method and system for determining radio signal delay due to ionosphere via tomographic ionosphere map
- Embodiments may include:
  - A tomographic (or similar volumetric) map of the ionosphere modeling ionospheric content as a function of position
  - One or more navigation satellites, at least one being close to the Earth such that part of the ionosphere is above it
  - A user knowing, at least approximately, his position and time with respect to the navigation satellites
  - The same user knowing the positions of the one or more navigation satellites © 2012 Coherent Navigation, Inc. All rights reserved. COHERENT NAVIGATION PROPRIETARY

Idea 4: Tomographic Model for LEO Satellite Ionosphere Delay

- Example reduction to practice:
  - A user knowing his position, time, and the orbit and clock offset of a single Iridium satellite
  - The same user also possesses a tomographic model of the ionosphere that allows him to calculate the ionosphere's index of refraction as a function of position (e.g. X, Y, Z) and time T
  - The user calculates the total ionospheric delay between him and the satellite via iterative refinement:
    - » Calculate the signal path between the user and the satellite assuming no ionosphere (signal travels along a straight line)
    - » Integrate the model along the signal path $l$ to determine the ionospheric delay $\Delta t$ between the satellite and the user at time T:

$$\Delta t(T) = \frac{1}{c} \int \left(1 - n(T, X(l), Y(l), Z(l))\right) dl$$

© 2012 Coherent Navigation, Inc. All rights reserved. COHERENT NAVIGATION PROPRIETARY

Idea 4: Tomographic Model for LEO Satellite Ionosphere Delay

» Recalculate the signal path between the user and the satellite using the calculated ionospheric delay and the calculated indices of refraction $n(T, X(l), Y(l), Z(l))$ along the previous path via raytracing » Recalculate the ionospheric delay along the new path between the user and the satellite via integration (same as before)

» Iterate the previous two steps until convergence. The resulting ionospheric delay will describe the effect of the part of the ionosphere between the user and the satellite © 2012 Coherent Navigation, Inc. All rights reserved. COHERENT NAVIGATION PROPRIETARY

Idea 5: Overlapping GNSS Observables for Ionosphere Delay

- Observation: Earth's Ionosphere induces delays in GNSS satellite signals operating in the L-band
  - Delay typically results in about 5m added ranging error
- Observation: a non-negligible portion of the ionosphere lies above Low-Earth orbit satellites, including Iridium
- Observation: most of the ionosphere lies below Mid-Earth orbit satellites, including GPS and other navigation satellites
- Observation: if two satellites ever align as perceived by a receiver (i.e. their line of sight vectors are substantially the same), then simultaneous measurements of those satellites can be used to determine the portion of the ionosphere that lies between them
  - Benefit: improved navigation ranging accuracy
  - Benefit: improved ionosphere model © 2012 Coherent Navigation, Inc. All rights reserved. COHERENT NAVIGATION PROPRIETARY

Idea 5: Overlapping GNSS Observables for Ionosphere Delay

- Title: method and system for determining radio signal delay due to ionosphere via overlapping satellites
- Embodiments may include:
  - Two or more satellites emitting signals
  - A user capable of making measurements of the two or more satellites at times where the satellites share substantially the same line of sight with the user (i.e. all align)
  - The same user knowing at least the distance between the two satellites and their clock offsets
    - » Optional: positions and clock offsets of the satellites are sufficient knowledge as well © 2012 Coherent Navigation, Inc. All rights reserved. COHERENT NAVIGATION PROPRIETARY

Idea 5: Overlapping GNSS Observables for Ionosphere Delay

- Example reduction to practice:
  - An Iridium and a GPS satellite that both share substantially the same line of sight to a particular user on Earth
  - The same user with a navigation radio knowing his own position, time, and the orbit and clock offsets of the Iridium and GPS satellites
    - » The navigation radio being capable of simultaneous measurements on at least two satellites
  - The user makes simultaneous pseudorange measurements to both satellites at a time when they share the same line of sight vector (overlap)
  - The user corrects the two pseudorange measurements for satellite clock offsets and orbits
  - The user calculates the ionospheric delay between the two satellites by differencing the simultaneous pseudoranges © 2012 Coherent Navigation, Inc. All rights reserved. COHERENT NAVIGATION PROPRIETARY

Idea 6: GNSS Augmentation with Relaxed Restrictions

- Observation: a number of GNSS augmentation patents exist that rely on overly-restrictive assumptions in their independent claims:
  - Requiring observable (e.g. carrier phase) differencing between two or more satellites and/or between two or more receivers
  - Requiring transmission of time-critical satellite observables from one receiver to another for the purposes of differencing and/or differential correction
  - Requiring that two receivers (e.g. one a reference station and one a user) share a common view of the same satellite
  - Requiring that two receivers (e.g. one a reference station and one a user) reduce observables to an integer-constrained optimization problem © 2012 Coherent Navigation, Inc. All rights reserved. COHERENT NAVIGATION PROPRIETARY

Idea 6: GNSS Augmentation with Relaxed Restrictions

- Observation: relaxing these requirements provides substantial benefit to the provider of navigation signals / augmentation services and to the navigating user:
  - Benefit: relaxed hardware and infrastructure requirements (e.g. fewer reference stations) for the navigation signal / service provider
  - Benefit: better availability of augmentation services (e.g. user does not need to be near a reference station)
  - Benefit: looser network latency and bandwidth requirements (e.g. data is not-time critical, and network latency / processing speed do not affect system performance to first order)
  - Benefit: relaxed satellite visibility requirements (e.g. user can navigate with fewer satellites than in a differenced solution)

© 2012 Coherent Navigation, Inc. All rights reserved. COHERENT NAVIGATION PROPRIETARY

Idea 6: GNSS Augmentation with Relaxed Restrictions

- Title: method and system for GNSS augmentation with relaxed infrastructure and equipment restrictions
- Embodiments may include:
  - One or more satellites emitting signals
  - A GNSS augmentation signal / service provider with:
    - » The ability to calculate or otherwise determine GNSS augmentations (e.g. via direct measurement or otherwise)
    - » The ability to distribute those GNSS augmentations to one or more users
  - One or more GNSS users with one or more radios © 2012 Coherent Navigation, Inc. All rights reserved. COHERENT NAVIGATION PROPRIETARY

Idea 6: GNSS Augmentation with Relaxed Restrictions

- Example reduction to practice:
  - One or more Iridium satellites emitting signals
  - One or more GPS satellites emitting signals
  - A GNSS augmentation signal / service provider with at least one reference station, performing one or more of orbit, clock, ionosphere, and troposphere determination on the Iridium and GPS satellites
  - The same GNSS augmentation signal / service provider transmitting, at a relatively slow update rate, one or more of the orbit, clock, ionosphere, and troposphere data to one or more users via standard Iridium data channels © 2012 Coherent Navigation, Inc. All rights reserved. COHERENT NAVIGATION PROPRIETARY

Idea 6: GNSS Augmentation with Relaxed Restrictions

- One or more GNSS users with one or more radios capable of receiving and decoding Iridium and GPS satellite signals
  - » Note: because the data is not time critical, only intermittent data connection is necessary
  - » Note: because no observables are transmitted to the user, the user does not need to be close to the reference station
- The one or more GNSS users use the GNSS augmentation data to improve their navigation experience
  - » Any orbit, clock, ionosphere, and troposphere data received by the user (e.g. data beyond that which is part of the standard GPS data message) can be used to reduce navigation error © 2012 Coherent Navigation, Inc. All rights reserved. COHERENT NAVIGATION PROPRIETARY

Idea 7: Simultaneous Orbit, Clock, Ionosphere, Troposphere Models

- Observation: typical GNSS observables such as pseudorange and Doppler shift are functions of satellite orbits and clocks, ionosphere, troposphere, and other perturbations
- Observation: typical orbit and clock determination techniques assume that ionosphere, troposphere and other perturbations are either known or small enough to be ignored
- Observation: this (typically ignored) information about the perturbations could be used to simultaneously determine satellite orbit and clock models along with models of the perturbing effects
  ○ Benefit: improved satellite orbit and clock determination
  ○ Benefit: improved perturbation models
  ○ Benefit: lower navigation error for a user making use of these models © 2012 Coherent Navigation, Inc. All rights reserved. COHERENT NAVIGATION PROPRIETARY

Idea 7: Simultaneous Orbit, Clock, Ionosphere, Troposphere Models

- Title: method and system for simultaneous satellite orbit, clock, and perturbation determination
- Embodiments may include:
  - One or more satellites emitting signals
  - One or more GNSS users with one or more radios capable of making measurements of the one or more satellites
  - The GNSS user(s) having a computer with a unified model of the satellite's orbit, clock, and signal path perturbations (e.g. ionosphere and troposphere) measurements as a joint function of the satellite's orbit, clock, and signal path perturbations (e.g. ionosphere and troposphere)
  - The GNSS user(s) using at least one measurement from the satellite(s) to update the said model

Idea 7: Simultaneous Orbit, Clock, Ionosphere, Troposphere Models

- Example reduction to practice:
  - One or more GPS satellites emitting signals
  - One or more GNSS users with one or more GNSS radios capable of generating measurements of the GPS satellite(s)
  - Models of the satellite's orbit and clock and Earth's ionosphere (e.g.) of the form:
    - » Satellite orbit as a function of true time: $X(t), Y(t), Z(t)$
    - » Satellite clock as a function of true time: $\delta t(t)$
    - » Index of refraction (through Earth's ionosphere) as a function of location: $n(t, X, Y, Z)$ © 2012 Coherent Navigation, Inc. All rights reserved. COHERENT NAVIGATION PROPRIETARY

Idea 7: Simultaneous Orbit, Clock, Ionosphere, Troposphere Models

- A model of a GPS satellite measurement, e.g. a carrier phase, that is a function of the aforementioned satellite orbit, clock, and the ionosphere:

» $PR(t) = \sqrt{[\Delta r(t - \delta t, \delta t_{ln}, \delta t_{trn})]^T \Delta r(t - \delta t, \delta t_{ln}, \delta t_{trn})} + c(\delta t + \delta t_{lm}) - c[a_{f0} + a_{f1}(t - t_{OC}) + \delta t_{rel}] + c\delta t_{ion} + c\delta t_{trop} + n$ » Reference: Psiaki, M. and Mohiuddin, S. "Modeling, Analysis, and Simulation of GPS Carrier Phase for Spacecraft Relative Navigation." AIAA Guidance, Navigation, and Control Conference and Exhibit. San Francisco, CA, 15 – 18 August, 2005.

» Note: satellite orbit is embedded in range delay $\Delta r$, satellite clock is embedded in coefficients $a_{f0}$, $a_{f1}$, and ionosphere delay is captured in $\delta t_{ion}$.

Idea 7: Simultaneous Orbit, Clock, Ionosphere, Troposphere Models

- A method and system to use (e.g.) pseudorange measurements to update satellite orbit and clock models and the ionosphere model
  - » Linearize pseudorange equation as a function of satellite orbit and clock parameters and ionosphere parameters
  - » Use (e.g.) standard linear least squares estimator to update models with pseudorange measurement
  - » Reference: Bar-Shalom, Y., Li, X., and Kirubarajan, T. Estimation with Applications to Tracking and Navigation: Theory, Algorithms, and Software. New York: John Wiley & Sons, Inc., 2001.

Idea 8: Communication of information via unused Iridium uplink data

- Observation: unused uplink channels in Iridium multicast broadcasts can be used by users to send data to Iridium satellites
- Observation: this uplinked data can consist of status information, activation of service, request of service, end of service, general text messages
- Observation: take, for example, service activation: user could press a button on the device on the receiver which then uplinks a data message to Iridium in an synchronized fashion with the satellite, but not with other users, and along with stored credit card information, the user's receiver is activated
  - Benefit: no need to make separate phone call to activate equipment
  - Benefit: user can activate equipment with single button on receiver © 2012 Coherent Navigation, Inc. All rights reserved. COHERENT NAVIGATION PROPRIETARY

Idea 8: Communication of information via unused Iridium uplink data

- Title: Method to communicate from user to satellite information in unused channels w/o synchronization between users
- Embodiments may include:
  - One or more users listening to downlink Iridium broadcasts
  - One or more users broadcasting information to satellite synchronized with the satellite time and distance to satellite © 2012 Coherent Navigation, Inc. All rights reserved. COHERENT NAVIGATION PROPRIETARY

Idea 9: Software updates and upgrades to users

- Observation: users listening to Iridium can receive software updates and/or upgrades via Iridium broadcasts
- Benefits:
  ○ Does not require user to update or upgrade software manually
  ○ Updates and upgrades can be downloaded and applied at a later date or immediately © 2012 Coherent Navigation, Inc. All rights reserved. COHERENT NAVIGATION PROPRIETARY

Idea 9: Software updates and upgrades to users

- Title: Method to update and/or upgrade receiver software via Iridium multicast broadcast
- Embodiments may include:
  - One or more users listening to downlink Iridium broadcasts
  - Receiver capable or receiving and storing software update or upgrade
  - Receiver capable of applying update or upgrade at a later date
  - Receiver capable or informing user that a new upgrade is available or has been applied © 2012 Coherent Navigation, Inc. All rights reserved. COHERENT NAVIGATION PROPRIETARY

What is claimed is:

1. A method comprising:

receiving at one or more reference stations first signals transmitted by one or more navigation beacons, at least one of the reference stations being able to receive at least one of the first signals from a low earth orbit (LEO) satellite;

determining by the reference stations first navigation observables based on the received first signals;

receiving at an augmentation server information associated with the first navigation observables;

determining by the augmentation server augmentation information based on at least the received information associated with the first navigation observables, known or computed locations of the reference stations, and computational models;

transmitting the augmentation information to a receiver using a distribution network;

receiving by the receiver the augmentation information;

receiving by the receiver second signals transmitted by the one or more navigation beacons;

determining by the receiver second navigation observables based on the received second signals; and determining by the receiver a high-precision position, velocity, and time (PVT) solution for the receiver based on the received augmentation information and the second navigation observables.

2. The method of claim 1 wherein the distribution network transmits the augmentation information to the receiver using a satellite.

3. The method of claim 1 wherein the distribution network transmits the augmentation information to the receiver wirelessly using a wireless hot spot or a cellular tower.

4. The method of claim 1 wherein the LEO satellite is an Iridium satellite.

5. The method of claim 1 wherein the augmentation information is limited in scope based on a geographic location of the receiver.

6. The method of claim 1 wherein the augmentation information is limited in scope based on a last segment in the distribution system between the augmentation server and the receiver.

7. The method of claim 1 wherein the augmentation information is limited in scope based on temporal information associated with the receiver.

8. The method of claim 1 wherein the high-precision PVT solution determines the location of the receiver to within 10 cm, 95% of the time.

9. The method of claim 1 wherein the one or more reference stations that receive at least one of the first signals from LEO satellites are less than 16 in number and provide sufficient first navigation observables to determine worldwide augmentation information.

10. The method of claim 1 wherein the computation models include a tomographic model for ionospheric effects.

11. The method of claim 1 wherein the receiver determines an initial high-precision PVT solution in less than 10 minutes after receiving the second signals.

12. A GNSS augmentation system, the system comprising:

one or more reference stations configured to receive first signals transmitted by one or more navigation beacons, at least one of the reference stations receiving at least one of the first signals from a low earth orbit (LEO) satellite; and an augmentation server coupled to the reference stations;

wherein:

each of the reference stations is configured to:

determine first navigation observables based on the received signals; and transmit information associated with the first navigation observables to the augmentation server;

the augmentation server is configured to:

determine augmentation information based on at least the received information associated with the first navigation observables, known or computed locations of the reference stations, and computational models; and distribute the augmentation information to a receiver using a distribution network, the distributed augmentation information being usable by the receiver to determine a high-precision position, velocity, and time (PVT) solution for the receiver based on second navigation observables associated with the receiver.

* * * * *